Figure 1:
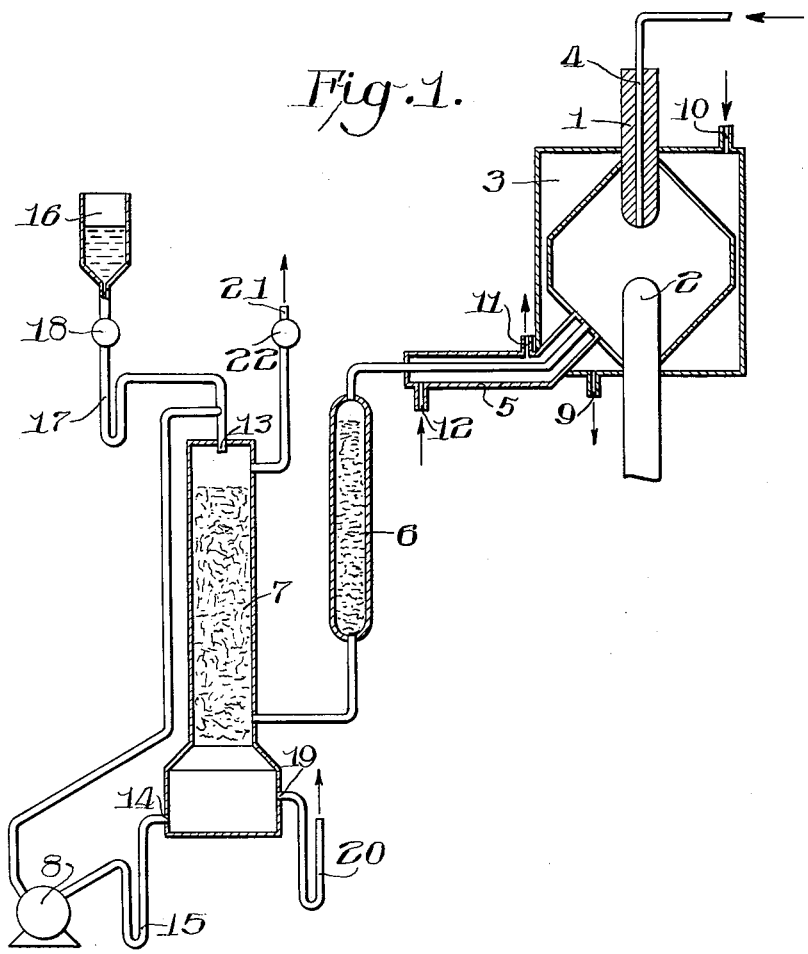

Aug. 22, 1961  H. GÄBLER ET AL  2,997,434
PROCESS FOR PREPARING HYDROGEN CYANIDE
Filed Nov. 19, 1958  2 Sheets-Sheet 1

INVENTORS
Hellmut Gäbler
Erich Schallus
Wilhelm Vogt
BY Connolly and Hutz
ATTORNEY

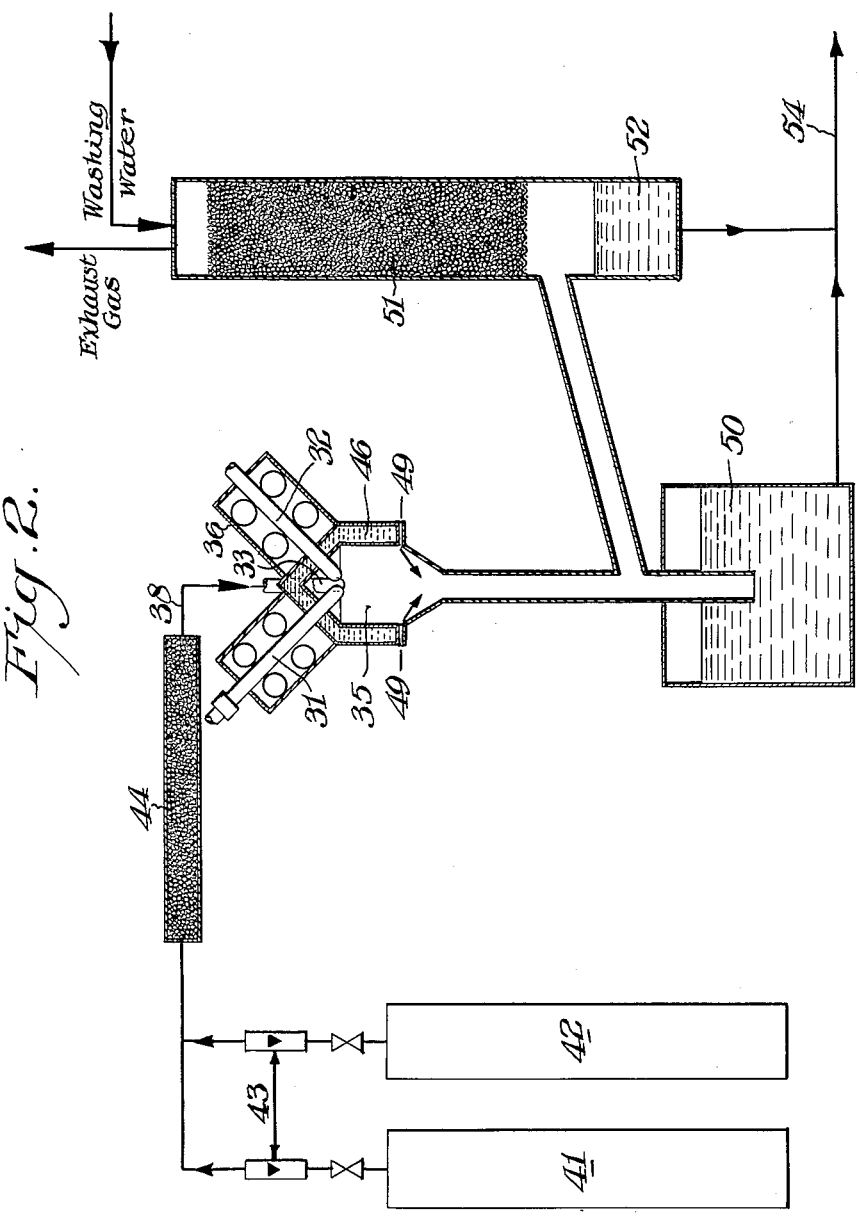

2,997,434
PROCESS FOR PREPARING HYDROGEN CYANIDE

Hellmut Gäbler, Erich Schallus, and Wilhelm Vogt, all of Knapsack, near Koln, Germany, assignors to Knapsack-Griesheim Aktiengesellschaft, Knapsack, near Koln, Germany, a corporation of Germany
Filed Nov. 19, 1958, Ser. No. 775,037
8 Claims. (Cl. 204—178)

The present invention relates to a process for preparing hydrogen cyanide by the high temperature pyrolysis of a mixture of ammonia and hydrocarbon material in an electric arc and is a continuation-in-part of our copending application Serial No. 462,349, filed October 14, 1954, now abandoned.

There are known a number of suggestions for the production of hydrogen cyanide from gaseous mixtures containing nitrogen and hydrocarbons with or without the addition of oxygen. By passing hydrocarbon gases in admixture with nitrogen through an electric arc there are produced only small amounts of hydrogen cyanide along with various by-products, e.g., unsaturated hydrocarbons, ethylene, acetylene, and polymerization products of HCN. If the starting mixture includes oxygen-containing material, however, water is necessarily produced as a by-product, and the presence of water vapor in the arc further reduces the amount of hydrogen cyanide that may otherwise be obtained.

U.S. Patent 2,596,421, granted May 13, 1952, states that hydrogen cyanide can be obtained from hydrocarbons, ammonia and oxygen in the form of air, without a catalyst, by passing said mixture through a gas flame in a time less than about $1/10{,}000$ second. This process, however, requires special attention to the provision of an usually thin gas flame, and even then the velocity of the reaction mixture is exceedingly high.

As indicated in this patent, the flame requires the use of concentrated oxygen or the preheating of the reaction mixture, a difficult thing to accomplish with rapidly moving gases. The speed of movement will be better appreciated by considering that a reaction time of $1/10{,}000$ second with a one inch thick flame calls for gas flow at the rate of 10,000 inches per second which is more than 600 miles per hour. Moreover, the technique used in this patent causes water to be formed along with the desired HCN, and as pointed out above, the presence of water in the hot reaction zone deleteriously affects the HCN yield.

U.S. Patent 2,706,675, granted April 19, 1955, suggests a method for recovering hydrogen cyanide from a high temperature reaction mixture by cooling the reaction mixture rapidly to a temperature below 400° C. while contacting said mixture with a relatively cool aqueous acidic solution of a polyhydroxy-boric acid complex.

It is also known to convert hydrocarbons and ammonia in the presence of noble metal catalysts and in the absence of oxygen into hydrogen cyanide, while simultaneously obtaining hydrogen. However, this process has considerable technical difficulties as regards the supply of the heat required for the reaction. Furthermore, the noble metal catalyst is not easy to handle and rather expensive in view of the unavoidable losses that take place.

The present invention is based on the discovery that very effective HCN yields can be conveniently and inexpensively obtained by flowing a gaseous mixture consisting essentially of ammonia and aliphatic hydrocarbon containing one to five carbon atoms and at most one olefinic bond, through an electric arc having a discharge intensity of at least 50 kilogram-calories per cubic centimeter per hour, there being from about 0.5 to 1.1 mols of ammonia for every gram atom of carbon in the hydrocarbon. After 0.001 to 0.05 second of exposure to the arc, the result mixture is withdrawn and immediately contacted with a cooling medium. This novel process is a decided improvement over that suggested in U.S. Patent 1,584,137, where a one second reaction time is mentioned, and furthermore needs no preheating as suggested in U.S. Patent 2,682,447.

The above exposure time is measured by noting the volume that represents the arc discharge zone and dividing this volume by the rate of reactant feed, using correction factors to adjust for the reactant volume changes caused by temperature and by the reaction itself. For example, a gas feed of 42 cubic meters at 30° C. and atmospheric pressure amounts to about 326 cubic meters at 1850° C. and atmospheric pressure. The temperature used for such conversion is that of the reaction zone and is measured by any convenient arrangement such as a thermocouple. The volume changes caused by the reaction itself are based on the fact that with methane as the hydrocarbon, the reaction takes essentially the following course:

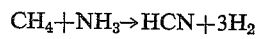
$$CH_4 + NH_3 \rightarrow HCN + 3H_2$$

so that two mols of reactant produce 4 mols of product. Considering then that on the average there are approximately 3 mols present for every two mols of reactant, this represents about a 150% increase in volume so that a 150% correction is applied. Other hydrocarbons give similar corrections.

In the above-identified parent application, the reaction time was merely estimated on the basis of the linear path of the reactants through the arc discharge. It now appears that the measuring technique as set out above is a much more accurate way of giving the reaction time and that the times given in the parent application were in error.

The optimum proportion of ammonia to hydrocarbon corresponds to about one mol of ammonia for each gram atom of carbon in the hydrocarbon. Particularly good results are obtained when the hydrocarbon is methane, or a mixture of $C_3$, $C_4$ and $C_5$ hydrocarbons such as commercially available in the form of petroleum refinery by-products. Such mixtures, for example have by volume about 20% propane, about 60% butane and the rest pentane. Any other proportions can also be used.

The improved results of the present invention appear to be attributable to the combination of specific arc exposure times and arc discharge intensities. In fact, the most effective intensities are greater than 200 kilogram-calories per cubic centimeter per hour.

The reaction in the arc is also greatly simplified by making at least one of the arc generating electrodes hollow and feeding the incoming gas mixture into the arc through the passageway thus provided by the electrode. The mixture accordingly starts from a location which shortens the path through the arc and thereby enables shorter arc exposures with lower and therefore more readily provided gas velocities.

The present invention as well as its objects and advantages will be better understood from the following description of several of its exemplifications, reference being made to the accompanying drawing wherein:

FIG. 1 is a schematic diagram of one form of apparatus for carrying out the process of the invention; and FIG. 2 is a fragmentary view similar to FIG. 1 showing a modification of that apparatus.

In the apparatus of FIG. 1 an arc is struck between electrodes 1 and 2 surrounded by a water-cooled chamber 3. Cooling water is supplied through inlet 9 and removed through outlet 10. Electrode 1, which preferably serves as a cathode when a D.C. arc is used, has a longitudinal bore hole 4 which serves as a passageway for the introduction of the gaseous mixture to be reacted. The chamber 3 is desirably made of iron, and the electrodes are sealed into it in gas-tight fashion as by means of fire clay or other high temperature cement. The electrodes themselves are made of any suitable electrical material such as graphite, carbon, iron, tungsten, etc. Chamber 3 may also be made of graphite, but then should not be water-cooled.

The reaction gases consisting of hydrogen cyanide vapor, hydrogen and nonreacted gases are withdrawn from the arc in tube 5 and further cooled there by a water jacket, tube 12 serving as supply pipe and tube 11 serving as delivery pipe for the cooling water. The gases are then freed from any fine soot that may be present by a filter 6 provided with glass wool or the like, and the hydrogen cyanide is separated from the hydrogen in washing tower 7 by dissolving out with water. The hydrogen cyanide may also be separated in the form of sodium cyanide by dissolving sodium hydroxide in this water. The washing liquid is advantageously circulated by means of pump 8 through the washing tower 7, which can be filled with loose clay or the like. It enters at 13, leaves at 14, and flows through siphon 15 back to pump 8. From supply vessel 16, a small amount of washing liquid continually flows by way of siphon 17 into the washing tower 7. The amount of washing liquid to be used is measured by a measuring device not shown in the drawing and the regulating cock 18. Pari passu with the introduction of the washing liquid from supply vessel 16 into the washing tower 7, the cyanide or hydrogen cyanide solution flows off at 19 and passes through siphon 20. The hydrogen formed in the course of the reaction leaves the washing tower by way of conduit 22 fitted with a valve 21.

FIG. 2 shows a modified apparatus in which a three phase arc is used.

According to this figure, an arc is struck between three graphite electrodes, 31, 32, 33 (only two of them are shown in full in the figure), arranged by means of feeding devices 36 as fast as they burn down. The arc is surrounded by the reaction chamber 35. The starting ingredients enter through conduit 38 which preferably terminates in a passageway through electrode 33. Said starting ingredients consist of hydrocarbons from container 41 and ammonia from container 42, each container connected with a measuring device 43, appropriate amounts of hydrocarbons and ammonia being mixed and passed through a dehydrator 44.

The reaction chamber 35 is water jacketed as shown at 46, to keep the walls relatively cool. A maximum wall temperature of 90° C. is preferred. In the illustrated embodiment, the inner chamber walls also have inwardly directed jet openings 49 just beyond the reaction space through which water is introduced to quench the reaction gas. The quenching water that is not vaporized flows down to container 50 while the reaction gas together with the vaporized water flows over to washing column 51 where HCN is washed out by washing water. The aqueous solution of HCN thus formed is recovered at 52. The liquids 50 and 52 are combined in line 54 to be distilled (not shown) in any known manner to set free the HCN.

The best place to measure the reaction temperature seems to be just outside and downstream from the arc discharge, before the rapidly moving reaction mixture impinges on the cooling surface. The temperature gradient within the arc discharge is too steep and furthermore is not an accurate indication of the temperature in the entire reaction zone inasmuch as this zone extends for an appreciable distance around the arc discharge zone. The reaction zone can be considered as all that space within which the temperature during the operation is at least as high as 1100° C. This generally extends about 3 inches beyond the limits of the arc discharge zone itself, with a somewhat greater extension in the direction of gas travel. Under the general conditions described above, the reaction zone can extend as much as 6 inches in this direction.

A feature of the present invention is that the reaction can be carried out at atmospheric pressure so there is no need to have equipment specially strengthened to accommodate the stresses that result from operation at subatmospheric pressure, for instance.

The following examples serve to illustrate the invention but they are not intended to limit it thereto. In all these examples the reaction time was determined by the above-described measuring technique, and the reaction itself was carried out at atmospheric pressure.

*Example 1*

The apparatus of FIG. 2 was used with the chamber 35 providing an arc discharge volume of 180 cc. The electrodes 31, 32, 33 made of graphite, with a diameter of 20 mm. each, were kept 10 mm. apart and the arc was maintained by a three-phase electric current. The voltage was adjusted (by means of a potentiometer) to about 180 volts (R.M.S.), thereby giving a current of about 700 amperes. The output was 220 kilowatts, and the discharge intensity amounted to 1050 kilogram-calories per cubic centimeter per hour. The reaction mixture passed through the chamber 35 in 0.0014 second. The internal surface of the chamber 35 in contact with the gaseous reaction mixture was maintained at about 80° C., and the temperature of the reaction zone was measured at 1850° C.

The reaction mixture was not preheated and was made up of 20 Nm.$^3$ (cubic meters measured at 0° and 760 mm. of mercury) of methane and 22 Nm.$^3$ of ammonia so that the mol ratio was 1:1.1.

42 Nm.$^3$ of the reaction mixture were per hour injected through conduit 38, and through 49 cooling water (of room temperature) was injected in an amount of about 0.5–0.6 liter per second. The gaseous reaction product-water mixture which had a temperature of about 80° C. when passing through the outlet, was recovered in 50, 52 respectively (the HCN was absorbed in 5% aqueous NaOH), and the solution was then worked up in a distillation arrangement. 16% of the ammonia was recovered unchanged and 79 to 82% of the converted ammonia was converted to HCN.

Reducing the mol ratio to 1:1 increases the HCN conversion to over 90% based on the ammonia converted.

*Example 2*

15 C.B.M. of ethane and 30 C.B.M. of ammonia at room temperature were mixed and passed at a velocity that permitted a 0.004 second dwell through a three-phase current arc burning between graphite electrodes. The volume of the reaction chamber amounted to 550 cc. and it took one hour for the above mixture to move through. The reaction mixture temperature was measured to be 1450–1500° C. The output was 220 kilowatts which amounted to about 350 kilogram-calories per cubic centimeter per hour. 28 kilograms hydrogen cyanide were produced. This corresponds to a yield of 86% based on the total amount of ammonia consumed and to a consumption of energy of 7.8 kilowatt-hours per 1 kilogram hydrogen cyanide, or 128 grams hydrogen cyanide per 1 kilowatt-hour, respectively. 2.1 kilograms or 10% of unreacted ammonia were recovered. The amount of carbon black produced during the reaction was less than 0.1% calculated on the carbon content present in the ethane used.

When the starting ingredients are diluted with hydrogen in an amount as high as 30% based on the ethylene, the same results are obtained.

*Example 3*

27 kilograms ammonia and 23 kilograms of a mixture of approximately equal parts of propane, n-butane and n-pentane having an average C-number of 4.05, were mixed and passed per hour through an electric arc as described in Example 2. The output was 250 kilowatts and the reaction mixture temperature was measured to be 1550° C. The conversion to hydrogen cyanide amounted to 61%, calculated upon the total ammonia, 23% of this total being recovered unchanged.

*Example 4*

Example 3 was repeated except that the hydrocarbon was replaced by an equal weight of an unheated mixture of butylene and hydrogen, as produced by the cracking of butane. The same conversion was obtained but only 19% of the total ammonia was recovered unchanged.

*Example 5*

27 kilograms of ammonia and 27.6 kilograms of butane (molar ratio 4:1.2) were mixed and passed per hour through a three-phase electric arc having an output of 200 kilowatts and a volume of 1.5 liters. 54% of the total ammonia was converted to hydrogen cyanide, 35% was recovered unchanged. The amount of butane which was not converted to hydrogen cyanide was converted to acetylene. The production of carbon black amounted to 0.5% calculated upon the carbon present in the used hydrocarbon, and did not hamper the reaction which can be kept running continuously for more than 24 hours, if desired. The reaction mixture temperature was measured to be 1250–1300° C. The reaction time was 0.015 second; the discharge intensity was 120 kcal./cc./hour.

By way of contrast, the following Example 6 shows a typical operation with an arc discharge intensity lower than the minimum described above.

*Example 6*

27 kilograms of ammonia and 23 kilograms of butane were passed per hour through a large arc furnace having a 5-liter arc discharge zone. Output: 220 kilowatts. The reaction time amounts to about 0.037 second. The load of the combustion chamber was 38 kcal./cc./hour. In the beginning, the conversion to hydrogen cyanide was 33%, referred to the input of hydrocarbon, and decreased during 25 minutes to 26%. After 30 minutes the apparatus was clogged completely by carbon black (soot). The reaction, therefore, was stopped.

Shortening the reaction time from 0.037 second to 0.015 second enabled operation for about an hour before there was too much plugging, and also reduced the conversion.

In Examples 2 through 6, the cooled arc chamber wall was maintained at 70° C., but no water spray was used.

The discharge chamber wall is preferably of metal to provide a better heat transfer, and high melting metals such as steel are particularly desirable. Low melting metals such as aluminum or brass are not too dependable since they may melt if the coolant supply should become interrupted.

Although the reactant should be immediately cooled to a temperature no higher than about 350° C., better results are obtained with cooling temperatures of 200° C. or below, and below 100° C. even further improvements are obtained.

When a D.C. arc or single-phase A.C. arc is used, substantially the same results are obtained except that it is much more difficult to reach the optimum discharge intensity. In all cases the electrodes tend to be consumed by the action of the discharge and are therefore preferably made continuously or intermittently adjustable as by automatic electrode feeders. A close fitting metal tube can be used as a guide for one electrode so that the tube can be cemented in place yet permit electrode adjustment without appreciable gas leakage from the discharge chamber.

The HCN recovery can be effected in any desired manner. The recovery system illustrated in FIG. 1 can for example be used with the reactor of FIG. 2, and vice versa. Liquids other than water can be used for spraying into the reactor outflow gases, and hydrocarbons such as n-pentane or other inert materials are effective for this purpose. Such liquids need not even be volatilizable although smaller quantities can be used where they volatilize and in this way give more effective cooling.

Obviously many other modifications and variations of the present invention are possible in the light of the above teachings. It is, therefore, to be understood that within the scope of the appended claims the invention may be practiced otherwise than as specifically described.

What is claimed:

1. In the process for preparing hydrogen cyanide from hydrocarbons and ammonia in an electric arc the improvement which comprises flowing a gaseous mixture consisting essentially of ammonia and methane at atmospheric pressure through an electric arc zone having a discharge intensity of at least 50 kilogram calories per cubic centimeter per hour, there being from about 0.5 to 1.1 mols of ammonia for every gram atom of carbon in the hydrocarbon, withdrawing the resulting mixture after from 0.001 to 0.05 second of exposure to the arc, and cooling the resulting mixture with a cooling medium.

2. In the process for preparing hydrogen cyanide from hydrocarbons and ammonia in an electric arc the improvement which comprises flowing at atmospheric pressure conditions a gaseous mixture consisting essentially of ammonia and aliphatic hydrocarbon containing one to five carbon atoms and at most one olefinic bond, through an electric arc zone having a discharge intensity of at least 50 kilogram-calories per cubic centimeter per hour, there being from about 0.5 to 1.1 mols of ammonia for every gram atom of carbon in the hydrocarbon, withdrawing the resulting mixture after from 0.001 to 0.05 second of exposure to the arc, cooling the mixture with a cooling medium.

3. The process of claim 2 in which the gaseous mixture flowing into the arc has about one mol of ammonia for each gram atom of carbon in the hydrocarbon.

4. The process of claim 2 in which the hydrocarbon is a mixture of $C_3$, $C_4$ and $C_5$ hydrocarbons.

5. The process of claim 1 in which the discharge intensity of the arc is greater than 200 kilogram-calories per cubic centimeter per hour.

6. The process of claim 1 in which the cooling medium is a metal wall that bounds the arc zone.

7. The process of claim 1 in which the cooling medium is a water spray at the boundary of the electric arc zone.

8. The process of claim 1 in which the cooling medium has a temperature no higher than 100° C.

References Cited in the file of this patent

UNITED STATES PATENTS

| | | |
|---|---|---|
| 2,057,282 | Tramm et al. | Oct. 13, 1936 |
| 2,706,675 | Chatelain | Apr. 19, 1955 |
| 2,858,261 | Pevere et al. | Oct. 28, 1958 |

UNITED STATES PATENT OFFICE
CERTIFICATE OF CORRECTION

Patent No. 2,997,434                                                    August 22, 1961

Hellmut Gäbler et al.

It is hereby certified that error appears in the above numbered patent requiring correction and that the said Letters Patent should read as corrected below.

Column 2, line 1, for "result" read -- resulting --; column 4, line 49, for "15 C.B.M. of ethane and 30 C.B.M. of ammonia" read -- 15 cubic meters of ethane and 30 cubic meters of ammonia --.

Signed and sealed this 10th day of April 1962.

(SEAL)
Attest:

ERNEST W. SWIDER                                      DAVID L. LADD

Attesting Officer                                        Commissioner of Patents